United States Patent [19]
Rowe

[11] 3,861,417
[45] Jan. 21, 1975

[54] INSTRUMENT CONSOLE FOR UNDERWATER DIVING APPARATUS

[76] Inventor: Gerald W. Rowe, 3280 Fort St., Lincoln Park, Mich. 48146

[22] Filed: Jan. 23, 1974

[21] Appl. No.: 435,884

[52] U.S. Cl. ............................ 137/557, 128/142.4
[51] Int. Cl. ............................................ F16k 37/00
[58] Field of Search ...... 137/557; 128/142.2, 142.4, 128/142

[56] References Cited
UNITED STATES PATENTS
2,406,888   9/1946   Meidenbauer ............... 128/142.4 X
3,524,444   8/1970   Ellard et al. ..................... 128/142

*Primary Examiner*—Henry T. Klinksiek
*Attorney, Agent, or Firm*—Harness, Dickey & Pierce

[57] ABSTRACT

There is disclosed an instrument console wearable in a visible place by an underwater diver and holding a plurality of instrument gauges, one of which is connected to the breathing apparatus carried on the diver's back.

21 Claims, 6 Drawing Figures

PATENTED JAN 21 1975 3,861,417
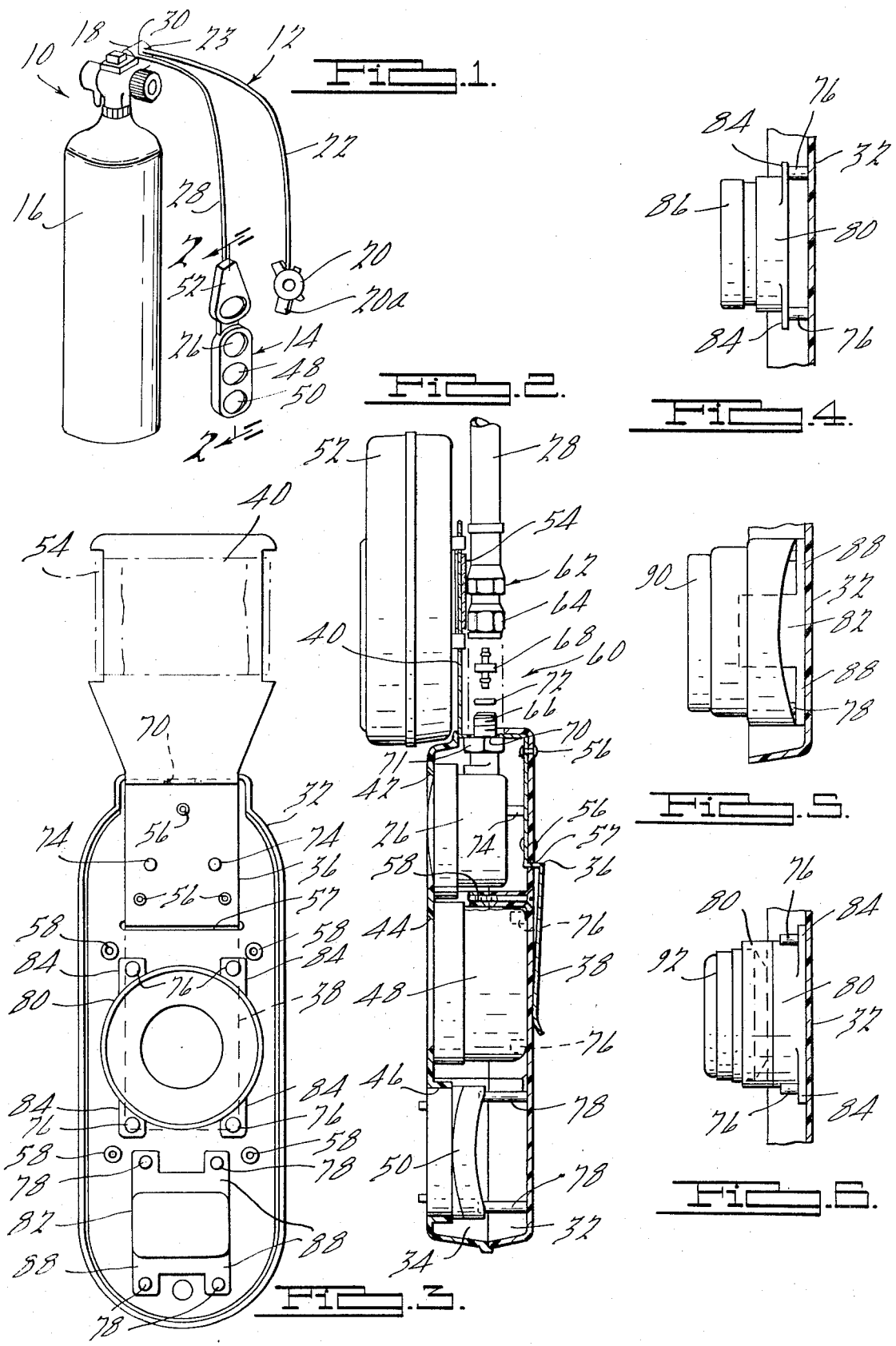

INSTRUMENT CONSOLE FOR UNDERWATER DIVING APPARATUS

BACKGROUND AND SUMMARY OF THE INVENTION

The present invention pertains to underwater diving equipment commonly known as "scuba gear" and, more particulary, to a novel instrument console for use with equipment.

Over the years, the sport of underwater diving has progressively increased in popularity. Many new product developments such as decompression computers, flotation devices, etc., have contributed to the popularity of the sport, some developments more so than others. However, one problem which underwater divers in all categories encounter is the time-consuming ritual of individually strapping the required instrument gauges on their arms. As impressively and securely strapped onto the diver as these instrument gauges may appear before descent, the increased ambient pressure which the diver experiences upon descent compresses the diver's body and thereby causes a loosening of the instrument gauges. To say the least, this creates a troublesome condition requiring the diver to be seemingly continuously making strap adjustments. Furthermore, there is always the possibility that one or more of the instrument gauges will actually come off, and, as a consequence, in deep water this creates the possibility of an instrument gauge falling to the bottom and being irretrievably lost. Additional disadvantages of arm-mounted instrument gauges are that they may not be conveniently viewable by the diver and that they may interfere to some extent with the maneuverability of the diver thereby detracting from the diver's enjoyment of the sport.

The present invention is directed toward a novel instrument console which eliminates the need to individually mount the required instrument gauges on the diver's body. Hence, with the present invention: the time-consuming ritual of individually strapping instrument gauges on the diver's arms is eliminated; the need to perform underwater strap adjustments for the instrument gauges is eliminated; the risk of losing instrument gauges is virtually nonexistent; and the arms of the diver are unencumbered by instrument gauges. The present invention provides a novel instrument console which is capable of containing a number of instrument gauges and which mounts on existing underwater breathing apparatus which the diver normally carries on his back. More particularly, the instrument console mounts on the existing pressure gauge which is operatively connected to the first stage regulator on the air tank by means of a flexible, submersible pressure gauge hose. This hose leads from the regulator around to the front of the diver's body and can be retained by means of an attaching strap on the chest of the diving suit worn by the diver. Hence, when the diver desires to consult one or more of his instrument gauges, the instrument console provides for quick, convenient viewing of all gauges.

Additional features and advantages of the invention, along with those enumerated above, will be seen in the ensuing description and claims which are to be taken in conjunction with the accompanying drawings. The drawings illustrate a preferred embodiment of the invention in accordance with the best mode presently contemplated for carrying out the invention.

BRIEF DESCRIPTION OF THE DRAWINGS

FIG. 1 is a perspective view of typical underwater breathing apparatus used by a diver and including an instrument console in accordance with the principles of the present invention.

FIG. 2 is an enlarged longitudinal sectional view taken in the direction of arrows 2—2 in FIG. 1, showing in longitudinal cross section the instrument console of FIG. 1 (including instrument gauges) and showing in exploded relation how the console is attached to the existing breathing apparatus.

FIG. 3 is a plan view of the instrument console by itself with its cover removed and further including insert elements therein which are useful in mounting certain instrument gauges in the console.

FIG. 4 is a fragmentary view illustrating the use of one of the inserts of FIG. 3 in mounting an instrument gauge.

FIG. 5 is a view similar to FIG. 4 showing the use of the other insert in mounting another instrument gauge.

FIG. 6 is a view illustrating the mounting of yet another instrument gauge.

DESCRIPTION OF THE PREFERRED EMBODIMENT

In FIG. 1, representative conventional underwater diving apparatus 10 includes conventional breathing apparatus 12 and the novel instrument console 14 in accordance with the principles of the present invention. Breathing apparatus 12 comprises: a standard high-pressure diving cylinder 16 containing a supply of compressed air; a conventional first-stage regulator 18 mounted on cylinder 16; a conventional second-stage regulator 20 including a mouthpiece 20a which connects via a submersible hose 22 with the low pressure port 23 of first-stage regulator 18; and a submersible pressure gauge 26 which connects via a submersible pressure gauge hose 28 with the high pressure port 30 of first-stage regulator 18. Cylinder 16 is typically worn on the back of the diver with the aid of suitable attaching harness (not shown) with hoses 22 and 28 leading from the cylinder over the diver's shoulders so that the diver can use mouthpiece 20a and so that submersible pressure gauge 26 can be held by means of a fastening strap on the chest of the diving suit worn by the diver. The diver draws air for breathing via mouthpiece 20a with the high pressure air from cylinder 16 (for example, 2,250 psi in a fully charged cylinder) being reduced to a pressure suitable for breathing by means of the first- and second-stage regulators 18 and 20. Submersible pressure gauge 26 operates to sense the pressure existing in cylinder 16 and to provide to the diver a reading of that pressure. In this way, the gauge serves to give an indication of the remaining air supply in cylinder 16.

In accordance with principles of the present invention, instrument console 14 mounts on the existing submersible pressure gauge 26 to provide for the diver a single readily viewable array of a number of instrument gauges. As detailedly shown in FIGS. 2 and 3, the illustrated preferred instrument console 14 is in the form of an enclosure comprising a base 32 and a cover 34, both preferably made from high impact polypropylene. An anodized aluminum bracket 36 forming both a belt clip 38 and a gauge mounting arm 40, is also a part of the console. Three circular openings 42, 44, and 46 are provided in cover 34. Submersible pressure gauge 26 is advantageously contained within instrument console 14 to be viewable through opening 42; additional instrument gauges 48 and 50 which are illustratively shown as a depth gauge 48 and a compass 50 respectively mount within instrument console 14 to be viewable through openings 44 and 46 respectively. A decompression meter 52 is securely strapped to mounting arm 40 of bracket 36 by means of a plastic belt 54. Bracket 36 is shaped to fit within base 32 as illustrated and is attached to base 32 by fasteners 56 such as rivets. A slot 57 is provided in the base through which the belt clip 38 is inserted preparatory to riveting bracket 36 to base 32. A plurality of four screws 58 serve to detachably secure base 32 and cover 34 together.

One way of securely mounting instrument console 14 on the existing pressure gauge 26 is by use of the existing fitting connection, designated in general by the numeral 60, between the submersible pressure gauge 26 and the submersible pressure gauge hose 28. As best seen in FIG. 2, which illustrates the fitting connection in exploded relationship, it can be seen that a swivel-type fitting 62 is securely and sealingly crimped to the end of hose 28. Fitting 62 includes a swivel nut 64 at the end thereof which serves to mate with a threaded stem 66 projecting from the submersible pressure gauge 26. A snubber 68 is internally contained between the two to provide a leak-proof connection when swivel nut 64 is tightly threaded onto stem 66. In order to mount instrument console 14 on an existing submersible pressure gauge 26 already connected to a diving cylinder, the submersible pressure gauge hose is disconnected from the submersible pressure gauge by disconnecting fitting 62 from stem 66. Cover 34 is removed and the submersible pressure gauge is placed in base 32 in the position illustrated in FIG. 2. It will be noted that a circular hole 70 is provided in bracket 36 permitting stem 66 to project therethrough. Suitable clearance is also provided in the corresponding end walls of cover 34 and base 32. The hose fitting is now reconnected to stem 66, snubber 68 being contained therein. Swivel nut 64 is tightened on stem 66 so that bracket 36 is tightly held between a hexagonal shoulder 71 on gauge 26 and the end of nut 64. For some particular models of pressure gauge, it may be necessary to insert, preparatory to reconnecting the hose to the gauge, a spacer element to compensate for the thickness of mounting bracket 36 so that snubber 68 is sealingly positioned between the fitting and the gauge. One way of doing this is by inserting a conventional O-ring 72 on the snubber as illustrated; in this way, the position of the snubber is properly maintained with respect to the hose fitting so that, when the connection is tightened to clamp bracket 36, a leak-proof, pressure-tight seal is achieved. It is desirable to check the connection for leakage after tightening to ensure proper functioning.

As best seen in FIGS. 2 and 3, a pair of location pins 74 are molded integrally with base 32 to project from the bottom thereof to a level for supporting pressure gauge 26. When cover 34 is reattached to base 32, the cover and the base with the aid of pins 74 serve to assist in securely holding the gauge within the instrument console, and this is beneficial to the overall mounting arrangement. It will be noted that suitable clearance holes are provided in bracket 36 for pins 74. A plurality of four integral centering pins 76 are arranged in a rectangular array in base 32 to center depth gauge 48; and a plurality of four longer pins 78 are arranged in a rectangular array to assist in supporting compass 50.

The invention possesses great versatility in accommodating numerous types of currently available instrument gauges. As can be seen from the gauges illustrated in FIG. 2, the integral pins 74, 76, 78 in base 32 can accommodate gauges of varying dimensions. If necessary, the pins can be cut down or removed entirely. Additionally, plastic spacer insert elements 80 and 82 (shown in FIGS. 3–6) are provided for use when needed. Insert element 80 is of circular annular shape providing a recessed seat for an instrument gauge and includes four tabs 84 having holes therein which permit the insert to fit onto pins 76. In FIG. 4, insert element 80 is shown in use in mounting a gauge 86. It will be noted that insert element 80 can be positioned on pins 76 at any desired distance from the bottom of base 32 to accommodate a particular gauge, with permanent positioning being assured by cementing the insert element in place on the pins with a suitable cement or adhesive. Insert element 82 is of rectangular shape and includes four tabs 88 having holes therein which permit insert 82 to fit onto the four pins 78. An illustrative use of insert 82 is shown in FIG. 5 with the insert mounting a gauge 90. FIG. 6 shows a further possibility in that two insert elements 80 are stacked one upon another, the upper insert preferably having the projection tabs thereof removed. It will be appreciated that the illustrated arrangements for mounting various instrument gauges in the console are illustrative and not exhaustive of the various possibilities. Hence, virtually any type of currently used gauges can be mounted on the instrument console in accordance with the present invention thereby rendering the invention a highly versatile and useful development in the field of underwater diving.

In light of the foregoing description of the preferred embodiment, it can be seen that the present invention attains the above enumerated advantages. With the present invention, it is no longer necessary for the diver to individually strap gauges on his arms; the need to perform underwater strap adjustments is eliminated; the risk of losing instrument gauges is virtually nonexistent; and the maneuverability of the diver is enhanced. All gauges are conveniently and readily viewable.

It is to be understood that the foregoing description is that of preferred embodiments of the invention. Various changes and modifications may be made without departing from the spirit and scope of the invention as defined by the appended claims.

What is claimed is:

1. In underwater diving apparatus for a user thereof, said apparatus including breathing apparatus comprising a supply of compressed air and means for permitting the user to draw air for breathing from said supply, a sensing and indicating means, coupling means having one end connected to said breathing apparatus and another end connected to said sensing and indicating means for operatively coupling said sensing and indicating means with said breathing apparatus such that said sensing and indicating means can sense and indicate to the user a condition existing in said breathing apparatus: a sensing and indicating means mounting means at said another end of said coupling means, and at least one additional sensing and indicating means mounted on said mounting means.

2. The invention defined in claim 1 wherein said mounting means comprises an enclosure means containing said at least one additional sensing and indicating means.

3. The invention defined in claim 2 wherein said enclosure means also contains said first-mentioned sensing and indicating means.

4. The invention defined in claim 1 including a fitting means connecting said coupling means with said first-mentioned sensing and indicating means, said mounting means attaching to said fitting means.

5. The invention defined in claim 4 wherein said fitting means comprises a fitting on said first-mentioned sensing and indicating means and a complementary fitting on said coupling means, said two fittings being connected together.

6. The invention defined in claim 5 wherein said mounting means is held between said two fittings.

7. The invention defined in claim 4 wherein said mounting means forms an enclosure around said first-mentioned sensing and indicating means.

8. The invention defined in claim 1 wherein said mounting means mounts on said first-mentioned sensing and indicating means.

9. The invention defined in claim 8 wherein said mounting means forms an enclosure enclosing said first-mentioned sensing and indicating means.

10. The invention defined in claim 8 further including a fitting means connecting said coupling means with said first-mentioned sensing and indicating means, said mounting means attaching to said fitting means.

11. The invention defined in claim 1 wherein said mounting means comprises an enclosure having first and second enclosure members detachably secured together, said additional sensing and indicating means being contained within said enclosure between said members.

12. The invention defined in claim 11 wherein said first-mentioned sensing and indicating means is also contained within said enclosure.

13. The invention defined in claim 12 including a further sensing and indicating means located exteriorly of said enclosure and mounted on said mounting means.

14. The invention defined in claim 13 wherein said mounting means includes an exterior member supported on said enclosure, said further sensing and indicating means being mounted on said exterior member.

15. The invention defined in claim 11 further including an inserted spacer element within said enclosure for supporting said at least one additional sensing and indicating means.

16. The invention defined in claim 11 further including a spacer means integral with one of said enclosure members for supporting said at least one additional sensing and indicating means.

17. In underwater diving apparatus for a user thereof, said apparatus including breathing apparatus comprising a supply of compressed air and means for permitting the user to draw air for breathing from said supply, a flexible connection leading from said breathing apparatus and terminating in a pressure gauge means for providing to the user an indication of a pressure condition in said breathing apparatus: an additional gauge means for indicating another condition of interest to the user, and mounting means mounting said additional gauge means on said pressure gauge means.

18. The invention defined in claim 17 wherein said mounting means comprises an enclosure containing said additional gauge means, said enclosure being mounted on said pressure gauge means.

19. The invention defined in claim 18 wherein said pressure gauge means is also contained within said enclosure.

20. The invention defined in claim 19 including a fitting means coupling said pressure gauge means to said flexible connection, said enclosure attaching to said fitting means.

21. The invention defined in claim 17 including a fitting means coupling said pressure gauge means to said flexible connection, said mounting means attaching to said fitting means.

* * * * *

Notice of Adverse Decision in Interference

In Interference No. 99,147, involving Patent No. 3,861,417, G. W. Rowe, INSTRUMENT CONSOLE FOR UNDERWATER DIVING APPARATUS, final judgment adverse to the patentee was rendered Feb. 17, 1977, as to claims 2, 3, 17, 19, 20, 21, 22, 24 and 25.

[*Official Gazette July 5, 1977.*]